(12) United States Patent
Lesovoy

(10) Patent No.: US 6,457,581 B1
(45) Date of Patent: Oct. 1, 2002

(54) DISC HOLDER WITH CENTER OPENING

(75) Inventor: Richie Lesovoy, Burlingame, CA (US)

(73) Assignee: Imagine Media, Inc., Brisbane, CA (US)

( * ) Notice: Subject to any disclaimer, the term of this patent is extended or adjusted under 35 U.S.C. 154(b) by 0 days.

(21) Appl. No.: 09/576,568

(22) Filed: May 22, 2000

(51) Int. Cl.[7] .............................................. B65D 85/57
(52) U.S. Cl. .................................. 206/308.1; 206/312
(58) Field of Search .............................. 206/308.1, 309, 206/310, 311, 312, 815; 383/207; 229/313, 314

(56) References Cited

U.S. PATENT DOCUMENTS

| | | | | |
|---|---|---|---|---|
| 1,329,466 A | * | 2/1920 | Miller | 229/400 |
| 4,470,511 A | * | 9/1984 | Meeker et al. | 229/313 |
| 4,549,658 A | * | 10/1985 | Sfikas | 206/312 |
| 5,085,318 A | | 2/1992 | Leverick | |
| D333,610 S | * | 3/1993 | Oshry et al. | D9/306 |
| 5,236,081 A | | 8/1993 | Fitzsimmons et al. | |
| 5,518,488 A | | 5/1996 | Schluger | |
| 5,590,769 A | | 1/1997 | Lin | |
| 5,690,219 A | * | 11/1997 | Harrer | 206/308.1 |
| 5,690,220 A | * | 11/1997 | Swan | 206/308.1 |
| 5,692,607 A | * | 12/1997 | Brosmith et al. | 206/308.1 |
| 5,931,293 A | * | 8/1999 | Seelenmeyer | 206/308.1 |
| 5,947,281 A | | 9/1999 | Kaneff | |
| 5,988,882 A | * | 11/1999 | Fisher et al. | 383/207 |
| D417,974 S | * | 12/1999 | Mori | D6/407 |
| 6,003,254 A | * | 12/1999 | Lorber | 40/124.06 |
| D419,358 S | * | 1/2000 | Marcon | D6/626 |
| 6,237,844 B1 | * | 5/2001 | Purcell | 229/313 |

FOREIGN PATENT DOCUMENTS

WO  WO 96/19808  * 6/1996

* cited by examiner

Primary Examiner—Shian Luong
(74) Attorney, Agent, or Firm—Howrey Simon Arnold & White, LLP

(57) ABSTRACT

A disc holder for either digital versatile discs (DVDs) or compact discs (CDs) is provided that has slot on the front of the holder extending from an opening of the holder past the center of the disc. The slot allows the user to remove the disc from and replace the disc into the holder without touching and thereby damaging the recorded section of the disc. The slot is perpendicular to the plane of the opening of the holder and extends from the middle of the opening. The slot can either be cut from the holder during assembly or it can be perforated during manufacture but left intact so that the user can create the slot upon use of the disc.

9 Claims, 7 Drawing Sheets

DISC HOLDER WITH CENTER OPENING

BACKGROUND OF THE INVENTION

1. Field of the Invention

The present invention relates generally to a disc holder, and more particularly, to a holder having a slot on the front of the holder. The slot on the front of the disc holder permits the user to handle the disc from the center and the outer edge of the disc without touching the recorded surface of the disc, thereby preventing damage to the recorded surface.

2. Description of Related Art

It is well known that compact discs, commonly referred to as CDs, have a recorded or recordable surface that may be damaged by contact, as discussed in U.S. Pat. No. 5,947,281 (this patent and all other patents referred to herein are hereby incorporated herein by reference). Therefore, CDs need protection during transport and times of non-use to avoid damage of the CD and its recorded surface.

Digital versatile discs, commonly referred to as DVDs, are even more vulnerable than CDs to damage to their recorded or recordable surface. Due to the short cycle of the injection molding of the polycarbonate, DVDs are softer and more impressionable than CDs. Accordingly, users need to carefully handle recorded or recordable discs, especially DVDs, to avoid damaging the recorded surface. The present invention is a holder that is useful for either DVDs or CDs, and the term "disc" used herein should be understood to refer to both DVDs and CDs.

The majority of disc holders are made of plastic or cardboard. Plastic holders in the prior art are generally called jewel boxes. Jewel boxes have a clear plastic cover and a plastic back hingedly connected to the cover. The plastic back generally has a plastic piece that protrudes from the center of the back for holding the disc in place. The use of jewel boxes as opposed to cardboard holders can have several drawbacks, many of which are discussed in U.S. Pat. No. 5,236,081. For example, they are larger, heavier, more complex, and more expensive than cardboard holders. Jewel boxes are also made of plastic, non-biodegradable material, which raises environmental concerns. Furthermore, jewel boxes are breakable.

As discussed in U.S. Pat. No. 5,518,488 and U.S. Pat. No. 5,236,081, cardboard holders avoid some of the problems associated with jewel boxes. Some cardboard holders in the prior art are complex, such as the ones described in U.S. Pat. Nos. 5,590,769 and 5,518,488, because they are designed to function like jewel boxes. These holders are more expensive, use more material, and are heavier than simple cardboard holders or sleeves.

Simple cardboard holders or sleeves in the prior art have the benefits of low cost and minimal size but have the drawback that they do not offer proper and easy handling, i.e., removal and replacement, of the disc into and out of the holder without touching the recorded surface. For example, U.S. Pat. No. 5,085,318 discloses a relatively simple cardboard holder, but the holder offers no quick and easy way for the user to remove the disc without touching the recorded surface.

In the prior art, simple cardboard holders or sleeves are usually square or rectangular and leave one of the front and back sides of the holder open and unconnected to allow the user to remove the disc. The holder is dimensioned so that the CD/DVD fits snugly inside. The snug fit is necessary to prevent the CD/DVD from falling out if the user picks up the case with the open edges facing down. This requisite snugness tends to hinder easy removal from the case, and often necessitates having to touch the outer recorded surface of the disk.

These simple prior art cardboard holders or sleeves completely cover the disc, except for perhaps a small part of the front of the CD/DVD, which is sometimes exposed by the use of a curved line along the middle of the front edge of the opening. The curved line is intended to facilitate the removal and replacement of the disc. The only way to remove a disc from this type of holder or sleeve is for the user to grasp the disc on the front and back faces. Thus, the user is forced to hold the recorded surface on the back face of the CD/DVD to pull the disc from the opening of the holder. This causes the user to leave fingerprints and smudges on the recorded surface of the disc, diminishing the performance of the CD/DVD. Insertion of discs into these simple cardboard holders does not necessarily require the user to touch the recorded surface, but handling of the recorded surface is still promoted from habit and from the user's inability to keep a firm hold on the disc as it is inserted.

Jewel boxes tend to promote mishandling of discs during removal as well. The plastic piece in the center of the back side of the jewel case snugly holds the CD/DVD in place to avoid contact between the holder and the disc and to prevent the disc from falling from the case. Often, the amount of force needed to remove the disc from the centerpiece causes the disc to bend before it is released. Although the user does not generally need to touch the recorded surface of the CD/DVD to remove it from a jewel box, the bending and potential breakage caused by the force applied and the annoyance of having to forcibly pull the disk out of the jewel box are drawbacks associated with the use of jewel boxes.

BRIEF SUMMARY OF THE INVENTION

A disc holder is provided that has slot on the front of the holder extending from an opening of the holder past the center of the disc. The slot is perpendicular to the plane of the opening of the holder and extends from the middle of the opening. The slot can either be cut from the holder during assembly or it can be perforated during manufacture but left intact so that the user can create the slot upon use of the compact disc. The slot allows the user to remove the disc from and replace the disc into the holder without touching the recorded section of the disc. The disc can be either a compact disc or a digital video disc.

DETAILED DESCRIPTION OF THE INVENTION

Figure 1A:
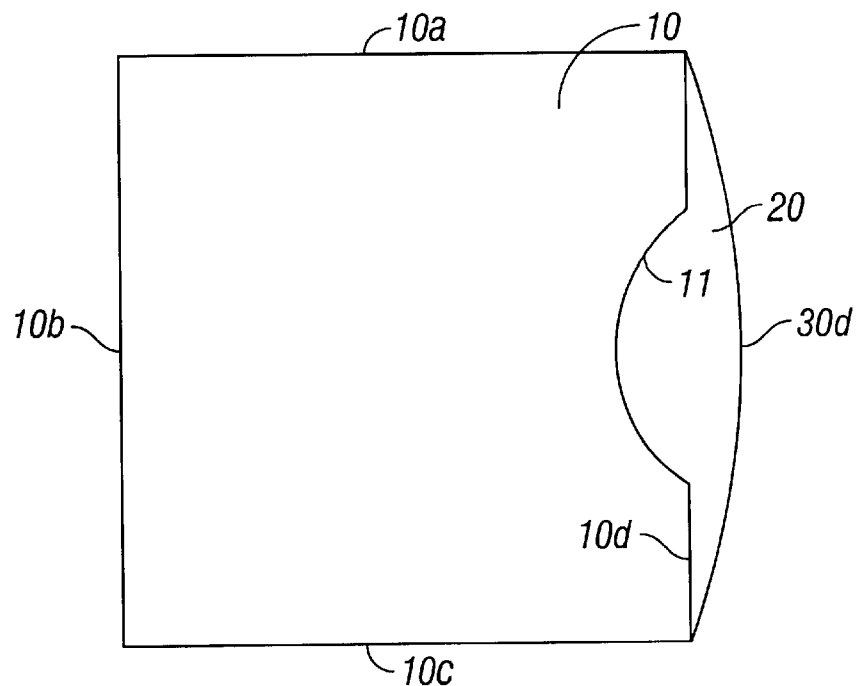
FIG. 1A is a front perspective view of an example of the prior art.

Broadly, it is the object of the present invention to provide a disc holder made of cardboard, card stock or other suitable material that overcomes the disadvantages of prior art disc holders. More particularly, it is the object of the present invention to provide a disc holder that promotes proper and easy handling of discs without compromising protection of the discs during transport and periods of non-use.

The present invention offers all of the benefits of simple cardboard holders, especially with regard to cost, size, and ecological concern. However, the present invention avoids the principal drawback of simple cardboard sleeves in the prior art, namely the problem of fingerprinting, smudging, and/or damaging the recorded surface of the disc during removal of the disc from the sleeve.

This invention can be used with discs of various sizes. All current discs have a circular opening in the center of the disc that is considerably smaller in diameter than the outer circumference of the disc. This circular opening is where mechanisms of the disc player and/or disc recorder hold the disc while it is being used. The recorded or recordable surface of the disc is on the back face, while the front face often contains graphics.

The disc holder of the present invention has a slot on the front side of the holder that is perpendicular to the opening of the holder and extends from the middle of the front open edge of the holder to at least the end of the circular center opening of the disc. The slot may either be perforated so that the user can remove the center to create the slot, or the slot may simply be cut from the front side of the holder. For maximum protection of the disc, it may be preferable to perforate the slot so that no portion of the front face of the disc is exposed prior to first use. If the slot is perforated, the cardboard that will be removed may be extended to give the user a tab to grasp when removing the material.

The slot is preferably at least as wide as the diameter of the circular opening in the center of the disc. The slot is no wider than that which will permit the disc holder to maintain its structural integrity. The slot allows the user to insert a finger, thumb or utensil into the center of the disc and, if desired, to access the outer circumference of the disc at the same time in order to easily and securely slide the disc out of the holder. The user can thereby keep continuous contact with the center, and the outer circumference if the user wishes, of the disc during removal of the disc from the holder without touching the recorded surface. The user is less likely to drop the disc when removing it in this manner and is less likely to hold the disc improperly, i.e., grasping the disc by the recorded surface.

The front face of the disc should face the front side of the holder when inserted so that the recorded surface on the back face of the disc is fully covered. The slot thus has the added benefit of allowing the user to see the graphics on the front face of the CD/DVD through the slot to more quickly identify the CD/DVD stored in the holder. These graphics can be specifically tailored to be framed by the opening defined by the slot.

The disc holder of the present invention can additionally have a cover that extends from the back-side of the holder along the edge that creates the opening for the disc's removal and replacement. The cover can provide extra protection to the CD/DVD as well as provide extra space for graphics on the holder. The cover can also act as a holder for inserts such as advertisements or instructions.

The methods of assembly according to the present invention include the steps of cutting a piece or pieces of cardboard that will form the holder, perforating or cutting out the slot that will allow the user to easily remove the disc, and folding and attaching the piece or pieces so that the holder is sturdy and to secure. The steps of cutting the cardboard, folding it, and attaching it are well known to those of skill in the art. The card stock or other material should be selected in accordance with the use of the holder. For example, if card stock is employed, the thickness, durability, and quality of the material used for the holder may vary depending on whether the holder will be shipped to the user in a package or will be individually sold. It is anticipated that other materials besides paper stock or cardboard could be used to construct the disc holder of the present invention. Such other material may, for example, be a plastic or polycarbonate derivative.

The preferred embodiments of the disc holder in accordance with the present invention will now be described with reference to FIGS. 1–9.

Figure 1B:
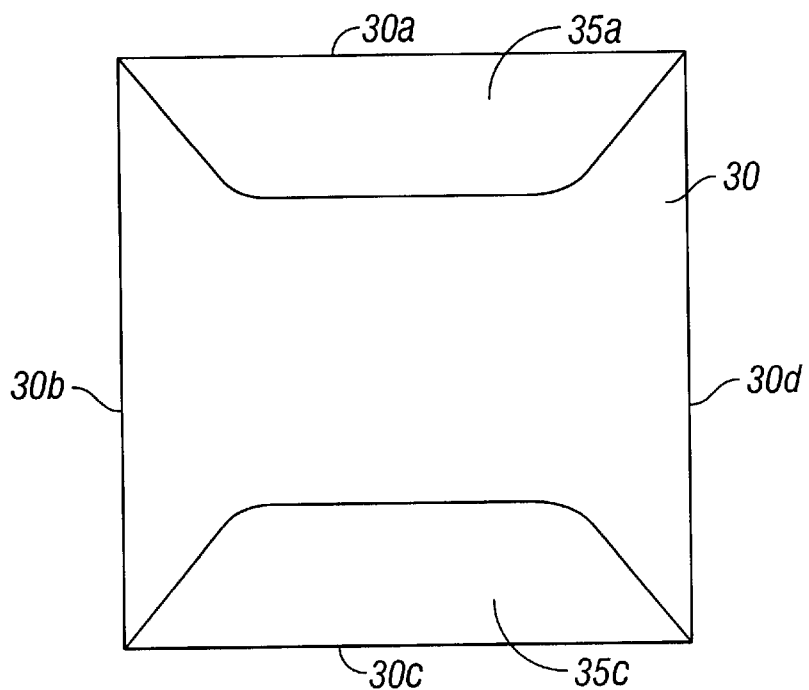
FIG. 1B is a rear perspective view of an example of the prior art.

FIGS. 1A and 1B show the front and rear views respectively of a typical disc holder made of cardboard in the prior art. The holder shown is a simple holder that is inexpensive to make and uses little material. The holder has a front side 10, a back side 30, and an opening 20. The front side 10 has four edges 10*a–d* and the back side 30 has four edges 30*a–d*. The front and back sides are connected so that three sets of corresponding edges, 10*a* and 30*a*, 10*b* and 30*b*, and 10*c* and 30*c,* meet and hold the CD/DVD. The remaining edge 10*d* on the front side 10 and the remaining corresponding edge 30*d* of the back side 30 stay unconnected and together form the opening 20.

In this particular prior art embodiment, front side 10 and back side 30 are one piece of cardboard, and edges 10*b* and 30*b* correspond to the fold line in the cardboard between the sides 10 and 30. Flaps 35*a* and 35*c* are extensions of the front side 10 from edges 10*a* and 10*c* respectively. Flap 35*a* folds where edges 10*a* and 30*a* meet, and flap 35*c* folds where edges 10*c* and 30*c* meet. The folded flaps 35*a* and 35*c* are then attached to the back side 30. Methods of attachment are known in the art.

FIG. 1A shows a curved line 11 that may be used to facilitate removal and replacement of the CD/DVD. The line 11 preferably corresponds to a circumference of a circle with a radius preferably close to the radius of the disc that the holder is meant to accommodate. A curved portion is removed from the middle of the front side 10 along the front opening edge 10*d* to form curved line 11.

Figure 2A:
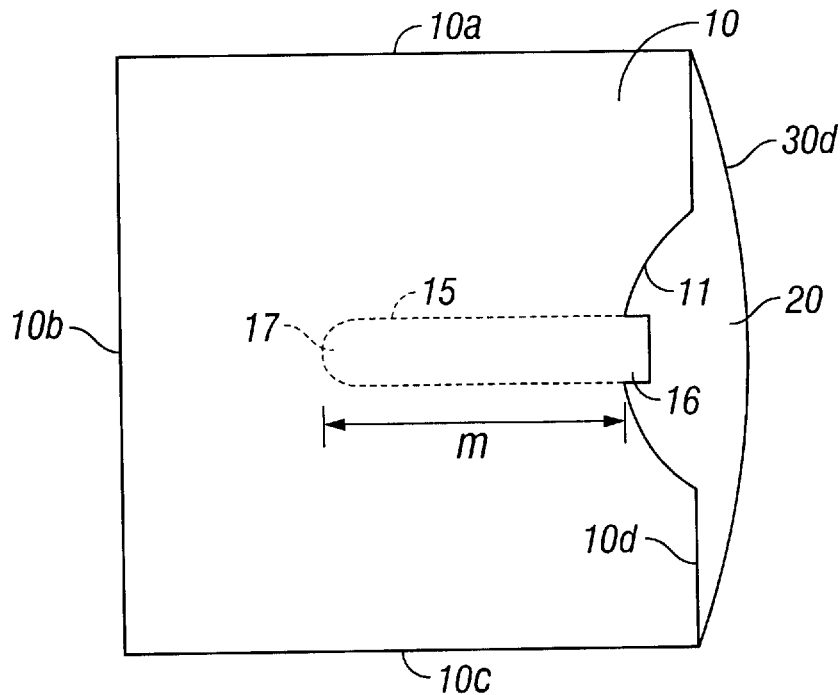
FIG. 2A is a front perspective view of a preferred embodiment of the invention in which a perforated outline of the slot and a tab are used.
Figure 2B:
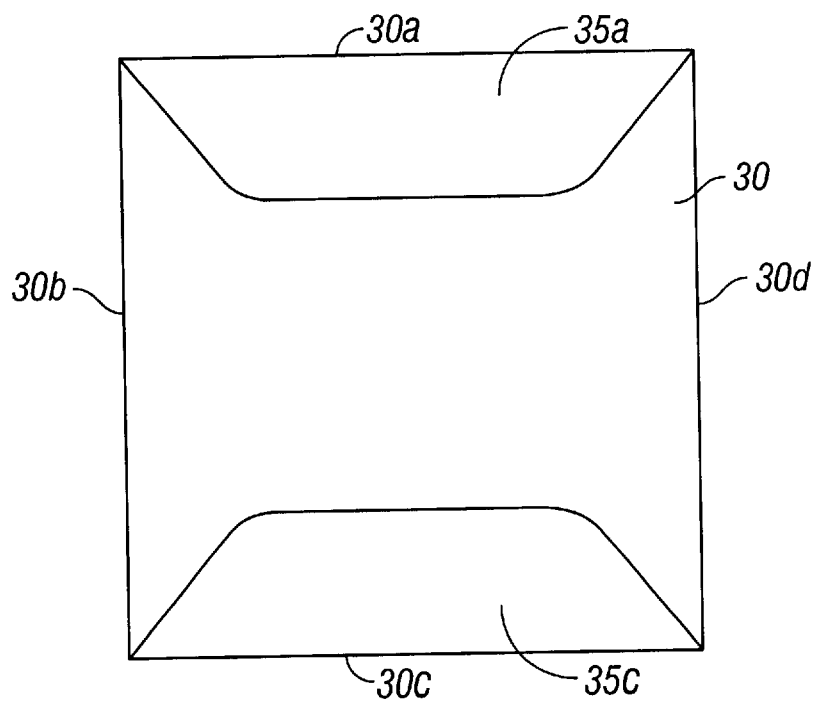
FIG. 2B is a rear perspective view of the embodiment of the invention from FIG. 2A.

The first preferred embodiment of the CD/DVD holder according to the present invention is displayed in FIGS. 2A and 2B. FIG. 2A is a front view and FIG. 2B is a rear view. The front side 10 of the holder has four edges 10*a–d,* and the back side 30 of the holder has four edges 30*a–d*.

As described above for FIGS. 1A and 1B of the prior art, in this particular embodiment, the front side 10 and back side 30 are one piece that is folded along the meeting line of the edges 10*b* and 30*b*. As FIG. 2B illustrates, there are also two flaps 35*a* and 35*c* that are extensions of the front side 10 from 10*a* and 10*c* respectively. Flap 35*a* folds along the meeting of edges 10a and 30a and flap 35c folds along the meeting of edges 10c and 30c. The flaps are then attached to back side 30.

The connections that result along edges 10a–c and corresponding edges 30a–c leave only one edge 10d of the front side 10 and one corresponding edge 30d of the back side 30. These edges 10d and 30d stay unconnected to form the opening 20 from which the disc is to be removed and replaced. In this embodiment, the edge 10d of the front side 10 has a curved line 11 formed by the removal of a curved portion of the front side 10, which facilitates replacement of the disc back into the holder.

The perforated slot 15 is perpendicular to the opening 20 and extends from the middle of the opening so that the slot that is formed once the cardboard is removed has at least the length m. The length of the slot m is determined by the size of the compact disc that the holder is made for. The dimensions of the holder generally are such that the CD/DVD will not easily fall out. The length of the slot m must be large enough to fully expose the circular opening in the center of the disc when the disc is inside the holder.

Additionally, the width of the slot n should be large enough so that either the user's finger or a tool can easily access the center of the disc. For the most common sized CD/DVD, the width of the slot n should preferably be between ½ of an inch to an inch. The width should not be too large to expose too much of the disc, sacrificing protection of the front of the CD/DVD or structural soundness of the holder. For larger discs, the width of the slot n can be made just wide enough for the average finger to access the center of the disc or wider if desired. For smaller discs, the width n can be decreased so that the user can easily access the smaller center of the smaller disc with a utensil or tool.

The perforated slot 15 also has a tab 16 that extends beyond the curved line 11 to make it easier to remove the cardboard and create the slot. In an embodiment that does not have the curved line 11, the tab 16 can extend beyond the edge 10d for the same effect.

Lastly, the perforated slot 15 is shown as having a semicircular shape 17 at the end farthest from the opening 20 of the holder. The slot 15 can also have a simple rectangular shape at the end opposite from the opening instead without changing the essential functionality of the invention. The semicircular shape may be preferred, because it is aesthetically pleasing and may help the user avoid paper cuts.

Figure 3:
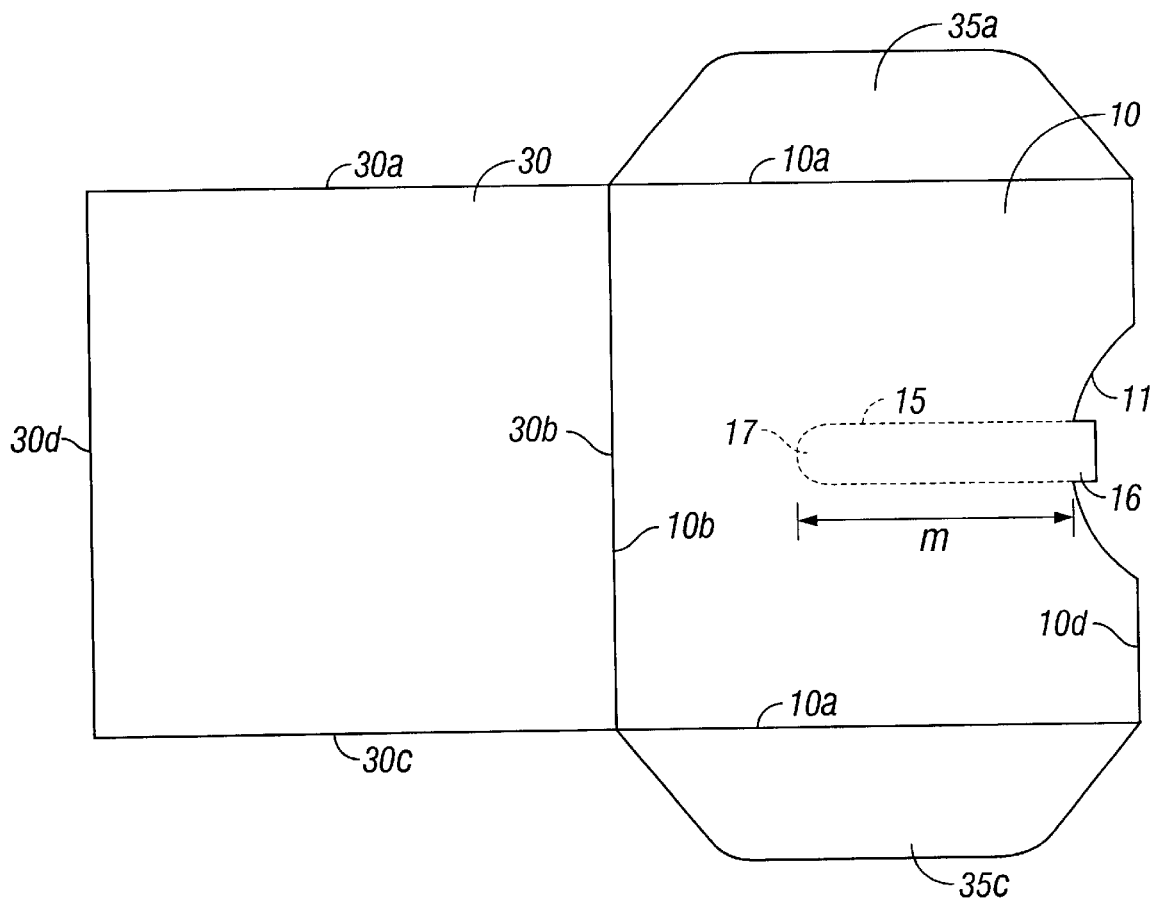
FIG. 3 is a perspective view of the embodiment of the invention from FIG. 2 prior to assembly.

FIG. 3 shows the initial unassembled cardboard piece that will be folded and assembled to form the disc holder of the present invention. FIG. 3 displays the same preferred embodiment as FIGS. 2A and 2B. The drawing illustrates the connectivity between the front side 10 and back side 30. Specifically, it shows that in this particular embodiment, the front side 10 and back side 30 are one piece of cardboard that is folded along the edges 10b and 30b, as described above. The drawing further illustrates that the flaps 35a and 35c are extensions of front side 10 from edges 10a and 10c. Flap 35a is folded at the meeting line of edges 10a and 30a, and flap 35c is folded at the meeting line of edges 10c and 30c. During assembly, the flaps 35a and 35c are then attached to back side 30 with means known in the art.

Figure 4:
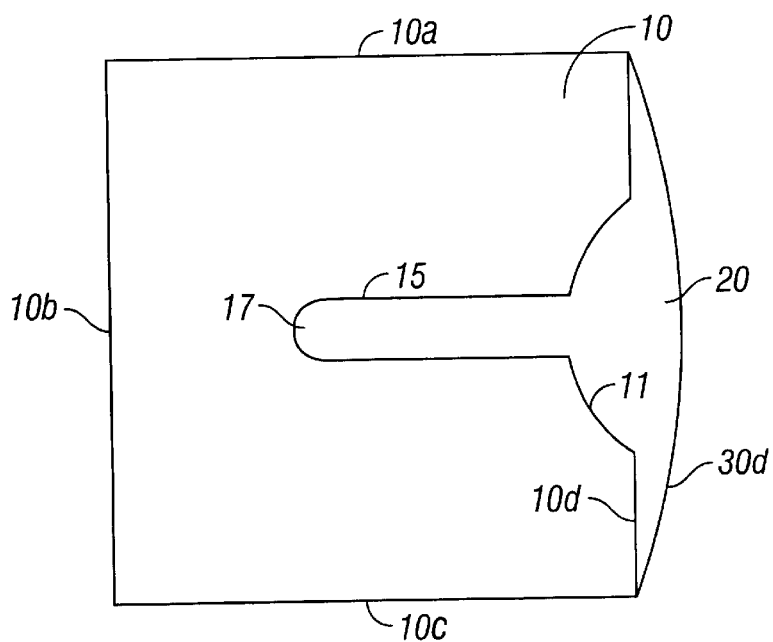
FIG. 4 is a perspective view of another preferred embodiment of the invention.

FIG. 4 illustrates a preferred embodiment of the present invention in which the slot 15 of the holder is cut from the assembly rather than perforated and left intact. In FIGS. 2A and 3, the slot was perforated so that the user could remove the material upon using the disc. This embodiment shows the slot 15 of length m extending perpendicularly from the middle of the opening 20. The slot in this embodiment is again shown with the semi-circular shape 17, but can be modified into a rectangular shape.

Figure 5:
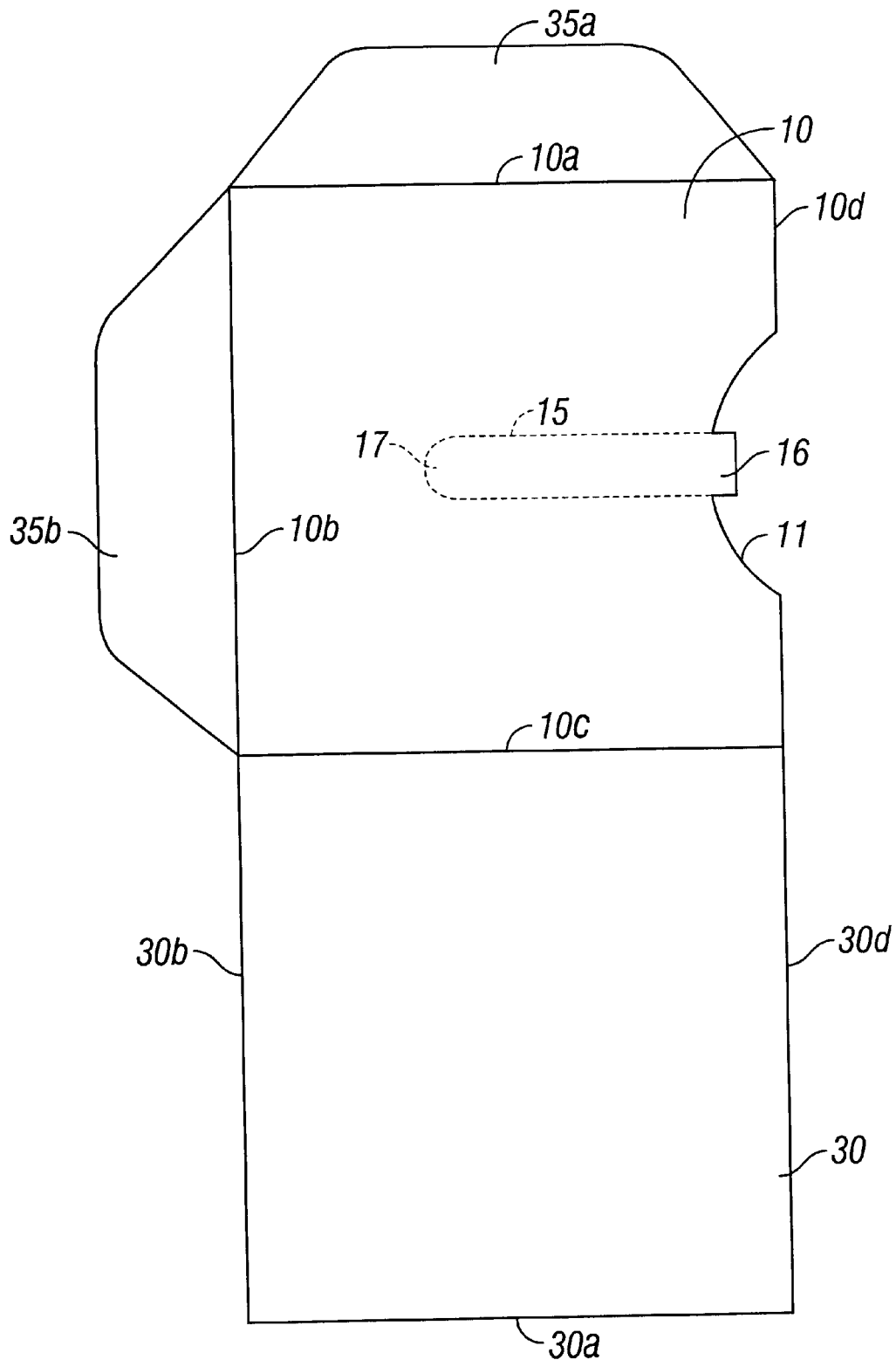
FIG. 5 is another embodiment of the invention prior to assembly.

FIG. 5 shows another embodiment of the invention in an unassembled state. This figure is provided because there are various ways to obtain proper connectivity between the front side 10 and back side 30 of the holder. In this case, the back side 30 and the front side 10 are again one continuous piece of cardboard. But, in contrast to the above embodiments, the cardboard is folded along the line where edges 10c and 30c meet, instead of where edges 10b and 30b meet. Then, the flaps 35a and 35b are provided to fold respectively along the meeting line of edges 10a and 30a and the meeting line of edges 10b and 30b. The flaps are attached to the back side 30 of the holder. In this manner, essentially the same holder as shown in FIG. 2A is produced using a different cardboard piece than the one shown in FIG. 3. Other variations will be apparent to those of skill in the art.

Figure 6:
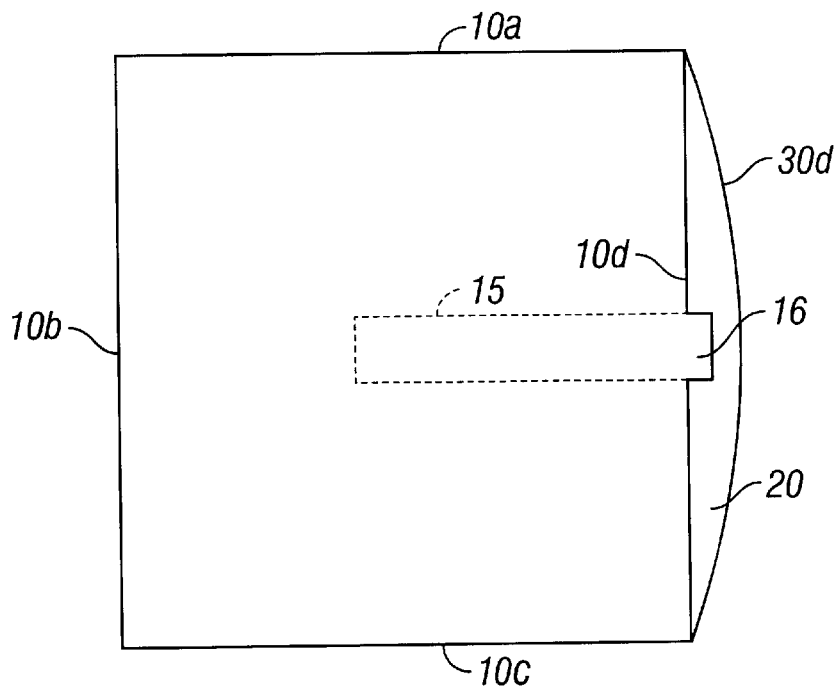
FIG. 6 is a perspective view of the invention where a circumferential section has not been removed from the front side of the holder.

FIG. 6 displays an embodiment of the invention in which edge 10d does not have the curved line 11 that is present in FIG. 2A. The curved line facilitates the replacement of the disc into the holder but is not an essential part of the invention. This figure also illustrates use of a rectangular slot 15, which does not change the functionality of the holder either. The holder in FIG. 6 is otherwise the same as the holder in FIG. 2A.

Figure 7:
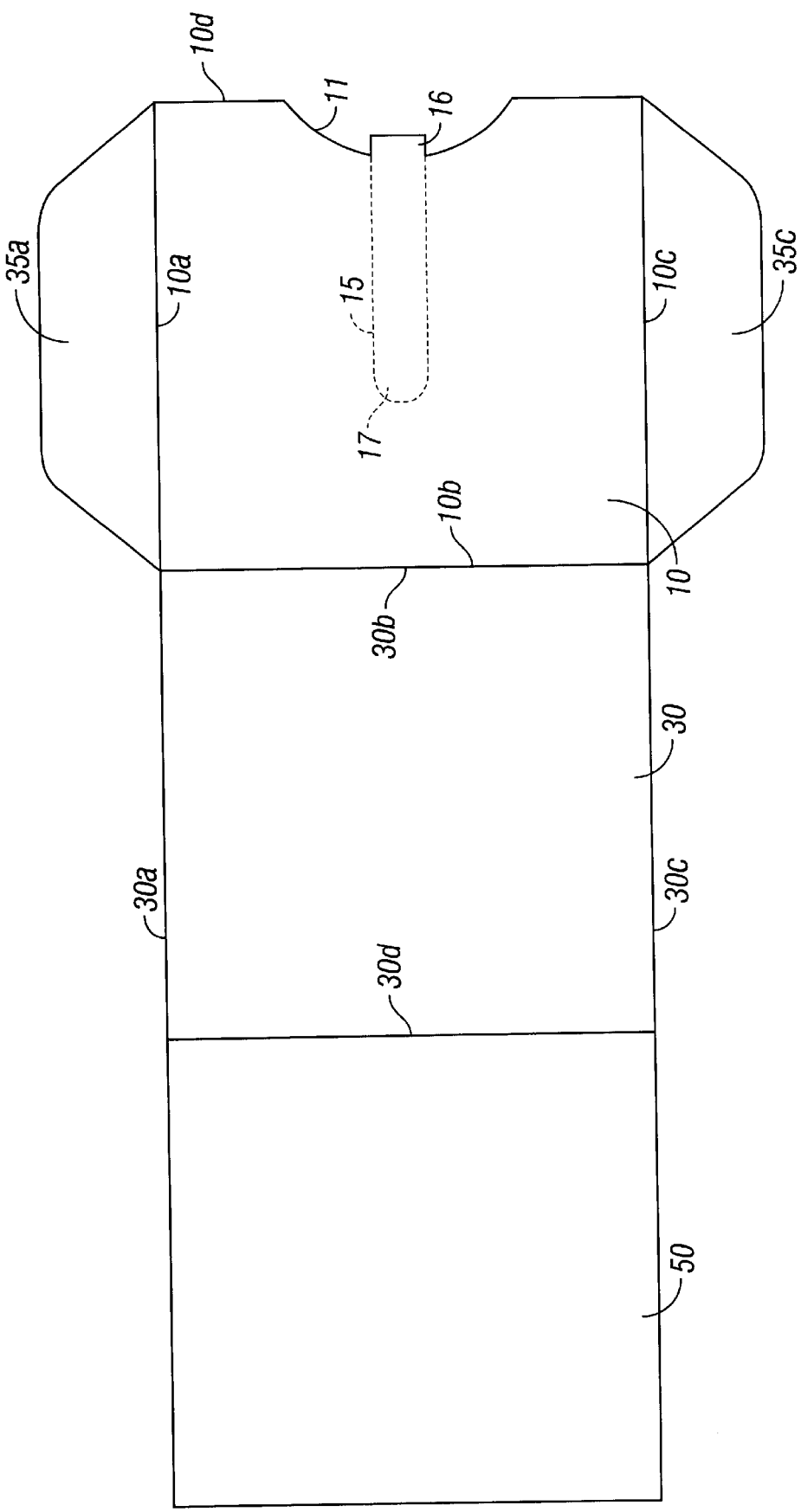
FIG. 7 is a perspective view of the embodiment of the invention from FIG. 2 prior to assembly where the holder also has a cover.

FIG. 7 is an unassembled version of the present invention in which a cover 50 is provided for the disc holder. This cover is connected to the back side 30 of the holder and is folded at the edge 30d. It should be noted that there is no requirement that the back side 30 of the holder be the same length as the front side 10 for this invention. For example, the illustration shows the length of the front side g and the length of the back side f. The length f can be greater or equal to but not smaller than the length g. Every other aspect of FIG. 7 is the same as the embodiment in FIGS. 2A and 2B.

Figure 8:
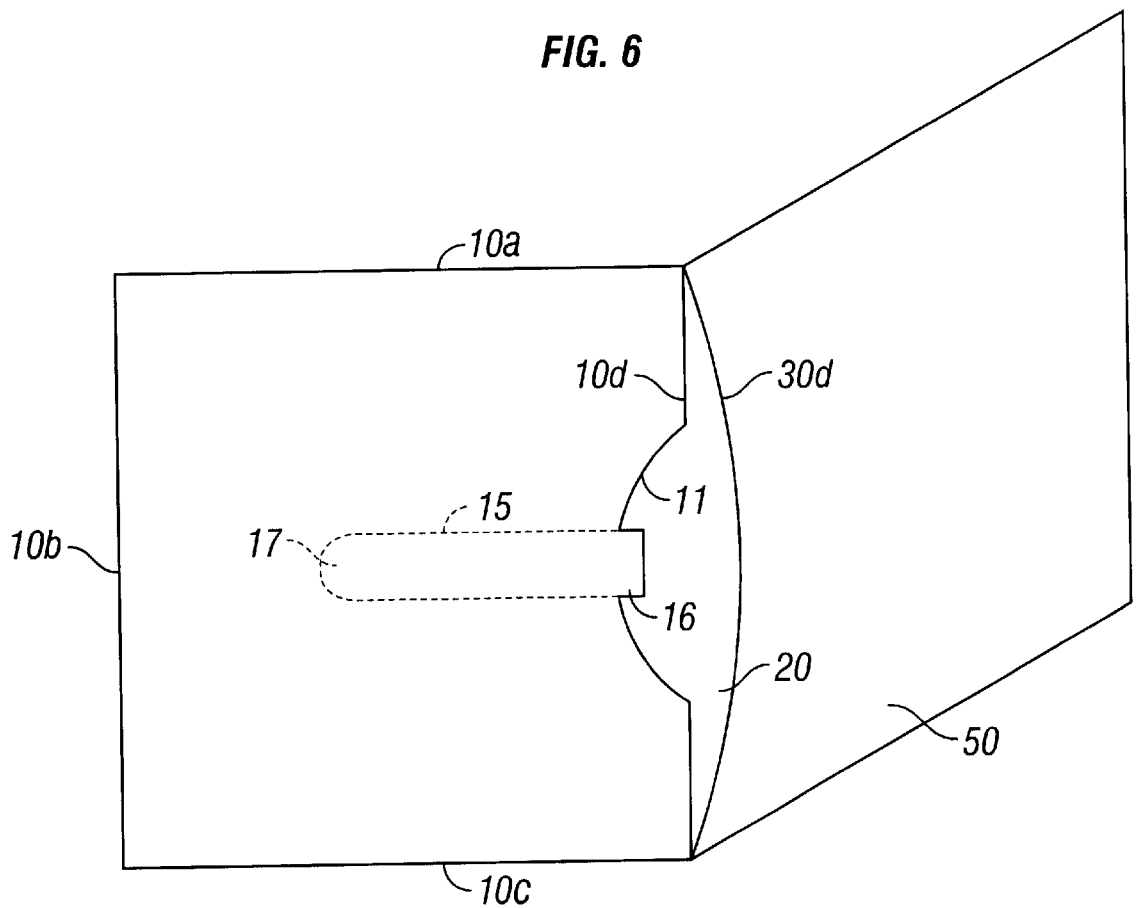
FIG. 8 is a perspective view of the embodiment of the invention from FIG. 2 after assembly with the cover opened.

FIG. 8 shows the version of the present invention from FIG. 7 in assembled form. Reiterating, the cover extends from the back side 30 and is folded at the corresponding edge 30d of the back side 30.

Figure 9:
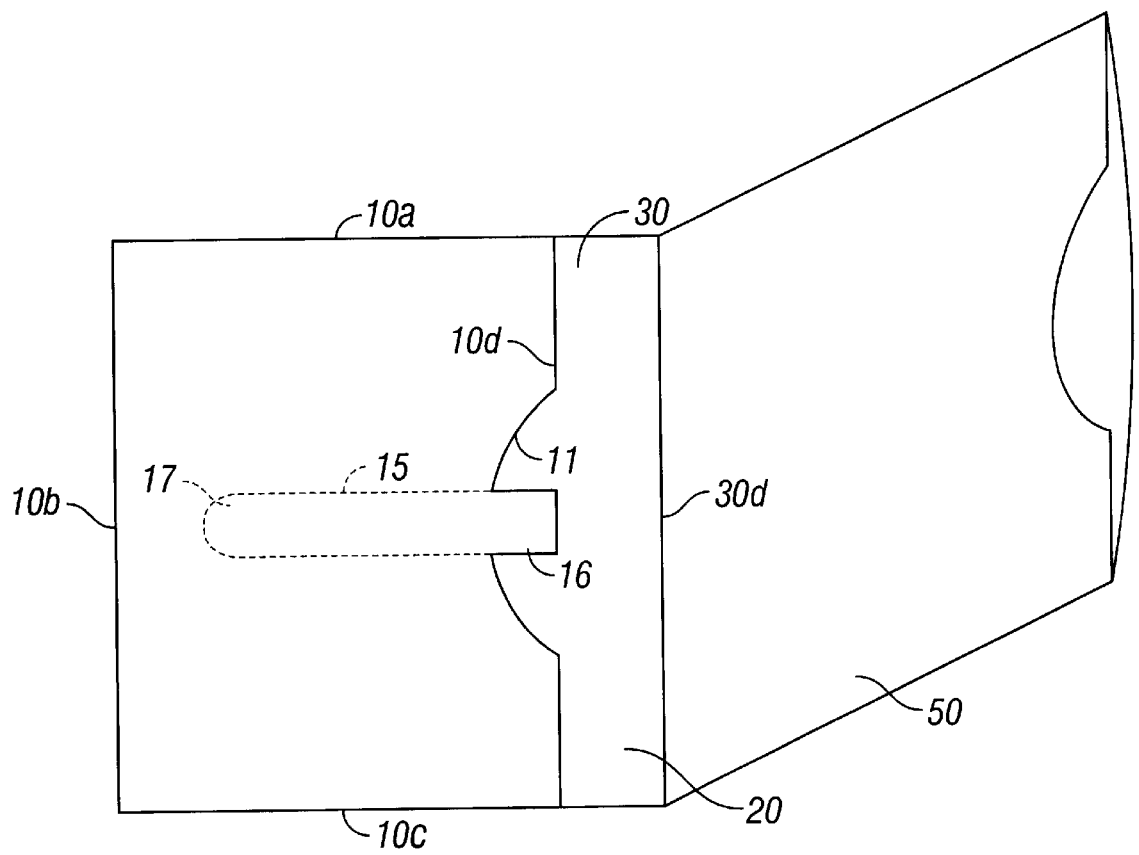
FIG. 9 is a perspective view of the embodiment of the invention from FIG. 8 in which the cover is capable of holding inserts.

FIG. 9 shows an assembled embodiment of the present invention, in which the holder has a cover that is capable of holding an insert. The cover is constructed to have a front and back side. The front and back sides of the cover can be connected using flaps as described above for the assembly of the portion of the holder that encloses the CD/DVD, or any other method known in the art can be used to construct the cover.

Various modifications and changes to the preferred embodiments described will be apparent to those of skill in the art. The foregoing description in no way limits the invention, whose scope is defined only by the claims recited herein.

What is claimed is:

1. An apparatus, comprising:
   a) a front side;
   b) a back side connected to said front side so that an edge of said front side is unconnected to a corresponding edge of said back side to create an opening for insertion or removal of a disc, wherein a center opening of an inserted disc aligns with a central portion of said first side and a central portion of said second side, and wherein said front and back sides are dimensioned to hold a disc; and
   c) a perforated slot along said front side that is perpendicular to said opening and extends from said opening past the central portions of said front and back sides.

2. The holder of claim 1, wherein said slot has a semi-circular shape at the end of the slot farthest from said opening.

3. The holder of claim 1, wherein said edge of said front side has a curved line around the middle of said opening.

4. The holder of claim 1, wherein said perforated slot has a tab that extends beyond said edge of said front side.

5. The holder of claim 1, further comprising a cover connected to said back side at said corresponding edge of said back side.

6. The holder of claim 1, wherein said front and back sides are composed of rigid material.

7. A method of constructing a cardboard disc holder comprising the steps of:

a) cutting a piece or pieces of cardboard so that a front panel, a back panel, and flaps that connect the front and back panels are designated, wherein said front and back panels are dimensioned to hold a disc and to allow a disc to be inserted and removed through an opening, and wherein a center opening of an inserted disc aligns with a central portion of said first panel and a central portion of said back panel;

b) perforating a slot in the front panel that extends perpendicularly from said opening past the central portions of said front and back panels; and c) assembling the holder by folding the panels and flaps and attaching the flaps to the front or back panel in accordance with the predetermined design.

8. The method of claim 7, further comprising the step of cutting a curved portion from said front panel along an edge of said front panel that will form said opening.

9. The method of claim 8, whereby the cutting of the curved portion leaves a tab intact that extends from the perforated slot past the edge of the front panel that will form said opening.

* * * * *